United States Patent
Irwin

[15] 3,706,483
[45] Dec. 19, 1972

[54] HEAT TRANSFER BEARING MOUNTING

[72] Inventor: Arthur S. Irwin, Bemus Point, N.Y.

[73] Assignee: TRW Inc., Cleveland, Ohio

[22] Filed: Oct. 6, 1971

[21] Appl. No.: 187,196

Related U.S. Application Data

[62] Division of Ser. No. 865,605, Oct. 13, 1969, Pat. No. 3,645,593.

[52] U.S. Cl. .................................................. 308/77
[51] Int. Cl. ............................................. F16c 37/00
[58] Field of Search ........................................ 308/77

[56] References Cited

UNITED STATES PATENTS 2,352,206  6/1944  Kendall ................................ 308/77

Primary Examiner—Martin P. Schwadron
Assistant Examiner—Frank Susko
Attorney—Hill, Sherman, Meroni, Gross & Simpson

[57] ABSTRACT

An anti-friction bearing assembly mounting wherein the inner ring of the bearing, in the preferred embodiment, is mounted on a hollow sleeve which in turn is mounted on the rotating shaft, the sleeve extends axially along the shaft and is hollow in the manner of an envelope. The interior is filled with a heat conductive material such as sodium and the axial end of the sleeve remote from the bearing has radially outwardly directed cooling fins associated therewith. In this manner, heat created during rotation of the bearing assembly is drawn away from the inner ring of the bearing to a point where it can be effectively dissipated.

5 Claims, 3 Drawing Figures

PATENTED DEC 19 1972

3,706,483

HEAT TRANSFER BEARING MOUNTING

This is a division of application, Ser. No. 865,605, filed Oct. 13, 1969, now U.S. Pat. No. 3,645,593, issued Feb. 29, 1972.

BACKGROUND OF THE INVENTION

1. Field of the Invention

This invention relates to anti-friction bearing assemblies and more particularly to a heat dissipating mounting for rotating bearing assemblies.

2. Prior Art

Anti-friction bearing assemblies and especially ball and roller bearing assemblies used to support rotating shafts, are being used in higher speed applications. Although the friction created during operation of such an assembly per rotation may be small, due to the high speed operation thereof, frictional heat can quickly build to a point where it will reduce the effective life of the assembly. Many systems have been devised for reducing or dissipating this heat. The most commonly used systems to date have been air or lubricant flow systems which attempt to remove the heat by circulating a flow of oil, air or other coolant, through the rotating bearing assembly. As speeds and loads of such assemblies increase, it becomes increasingly difficult to cool the bearing assembly by subjecting it to such a flow. Further, in many instances bearing assemblies are used adjacent a seal which is designed to prevent a flow in the axial direction, thereby interfering with the ability to cool the assembly.

Many attempts have been made to reduce the heat by providing a coolant flow through the housing in which the assembly is received. However, of the net heat generated in an anti-friction bearing, more heat flows to the inner race ring than flows to the outer. Further, preferential removal of heat through the housing or outer member of the bearing system creates differences in thermal expansion which disturb the bearing geometrical parameters, for example, the dimensional clearances. Removal of heat from the inner race ring is complicated by the fact that the race must rotate with the shaft which it supports.

SUMMARY OF THE INVENTION

In order to overcome these deficiencies of the prior art, my invention provides, in a preferred embodiment, a shaft carried hollow envelope member on which the inner race ring of the bearing assembly is mounted. The envelope is filled with a coolant, such as sodium, which has a high thermal conductivity. The envelope extends axially along the shaft to a point, generally exterior of the housing, where radial clearance is sufficiently large to accommodate radially extending cooling fins for dissipation of the heat carried by the coolant. In order to increase the effectiveness of the heat removal, the coolant is preferably entrapped in a thin-walled envelope. The walls are kept thick enough to provide dimensional stability during operation, but thin enough to allow good thermal conductivity. To further enhance the cooling capacity of the device, the heat radiating fins may be subjected to a coolant bath of oil, water, air or the like.

In an alternative embodiment, the inner race of the anti-friction bearing assembly may be formed as a portion of the outer diameter of the coolant filled envelope. Additionally, in yet another embodiment, the inner or outer raceways or both may be hollow and filled with the coolant with radiating fins, if desired, extending axially or radially.

It is therefore an object of this invention to provide an increased cooling capacity bearing mounting.

It is another object of this invention to provide a mounting for anti-friction bearings consisting of a shaft-carried hollow envelope filled with a high thermal conductivity coolant.

It is a specific object of this invention t provide an anti-friction bearing assembly member for use with rotating shafts, the member being adapted to receive the inner raceway of the bearing at one end and to encircle the shaft and extend axially therealong for a distance, the other end of the member having radially extending cooling fins, the member having a hollow interior and being filled with a high thermal conductivity coolant.

It is a general object of this invention to provide an anti-friction bearing assembly for high-speed shaft mountings which utilizes a hollow member filled with a high thermal conductivity coolant to dissipate operating heat from the anti-friction bearing.

BRIEF DESCRIPTION OF THE DRAWINGS

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
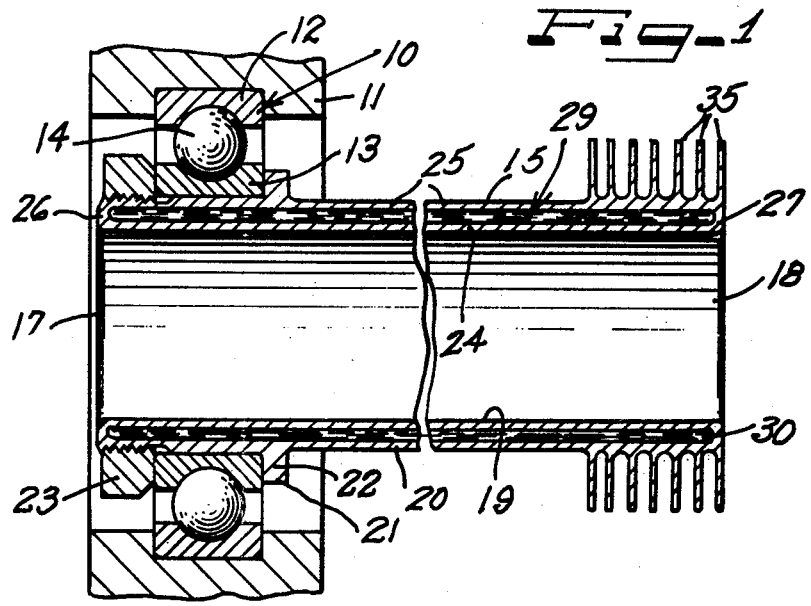
FIG. 1 is a fragmentary cross-sectional view of an anti-friction bearing assembly received in a housing and associated with a shaft encompassing heat transfer mounting member.

FIG. 1 illustrates an anti-friction ball bearing assembly 10 received in a housing 11. The anti-friction assembly 10 consists of an outer race ring 12, a concentric inner race ring 13, and a series of anti-friction rolling elements 14 interposed therebetween. A coaxial heat transfer mounting member 15 is disposed radially inwardly of the inner race ring 13.

The mounting member 15 is designed to encircle a shaft (not shown) which is rotatable with respect to the housing 11 and which is retained in position through the bearing assembly 10. The mounting member 15 is utilized to effectuate dissipation of operation caused heat from the inner race ring 13 of the assembly.

The member 15 is affixed to the shaft, either by a press-fit relationship or by brazing or other fastening methods, and rotates therewith. The member 15 is axially elongated and has one end 17 adjacent the bearing assembly and its other end 18 spaced therefrom a desired distance along the shaft. The inner diameter 19 rides on the shaft while the outer diameter 20 is configured as at 21 to receive the inner race 13 of the bearing assembly.

In the embodiment illustrated in FIG. 1, the inner raceway 13 of the bearing assembly is entrapped between a shoulder 22 on the outer diameter 20 and a retaining nut 23 threaded onto the end 17.

The member 15 is constructed in the manner of an envelope with inner 24 and outer 25 spaced-apart axially-extending walls closed by end walls 26 and 27 at the axial ends 17 and 18. The hollow circumferential cavity 29 between the inner and outer walls 24 and 25 is filled with high thermal conductivity coolant 30 such as sodium. Although sodium is described as a preferred coolant, it is to be understood that any liquid or liquefiable high-thermal conductivity coolant may be used.

The outer wall 25 of the member 15 is maintained as thin as possible with due regard to operational stability and radial load pressures. Where necessary, the end 17 of the member 15 which receives the inner race ring may be constructed thicker than the remaining portions of the member.

The end 18 has a series of radially extending cooling fins 35 associated therewith for the effective dissipation of heat from the member 15. The cooling fins may be spaced from one another and be of a number and size designed to produce the most effective results. The end 18 is spaced from the end 17 a distance sufficient to place the cooling fins 35 at a point, with respect to the bearing assembly 13, where there is sufficient space for the heat to be radiated from the fins. Radiation of heat may be aided by the provision of an oil, air, water or other coolant bath.

Due to the thermal conductivity of the coolant 30, it can be seen that heat will be drawn from the inner race ring 13 of the bearing assembly through the thin outer wall 25 of the member 15 and then to the cooler end 17 of the member where it will be dissipated through the fins 35. In this manner, the bearing assembly may be kept relatively cool during operation. Of importance here is the fact that my invention does not interfere with the use of normal lubricating and/or cooling systems in connection with the bearing assembly 10, but may be used to complement such systems. Further, my invention does not relay upon any moving members or complicated mechanical structures.

Figure 2:
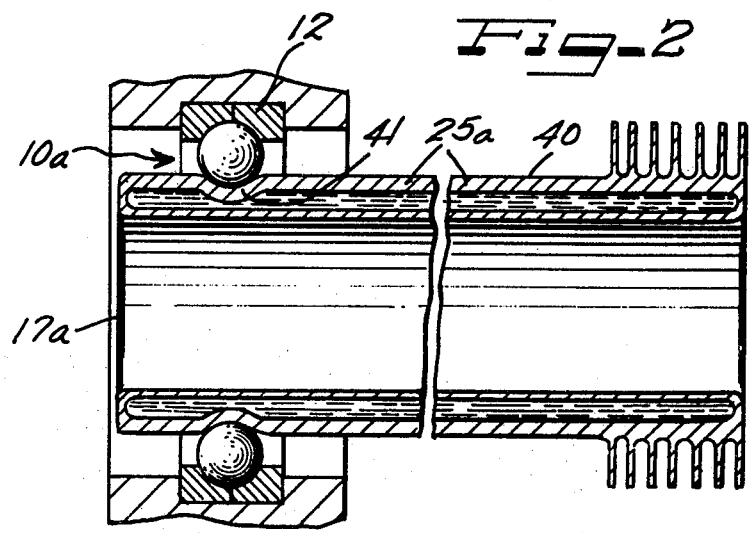
FIG. 2 is a cross-sectional fragmentary view similar to FIG. 1 illustrating a different embodiment of the heat transfer mounting wherein the mounting serves as the inner race ring.

FIG. 2 illustrates a modification 40 of the member 15 which has the outer wall 25a contoured with a circumferential groove 41 adjacent the end 17a. The groove 41 provides the inner raceway for the bearing assembly 10a. In this manner, heat dissipation through the wall 25a may be enhanced while at the same time providing a semi-yielding inner raceway if desired. The member 40 acts to dissipate heat in substantially the same manner as the member 15.

Figure 3:
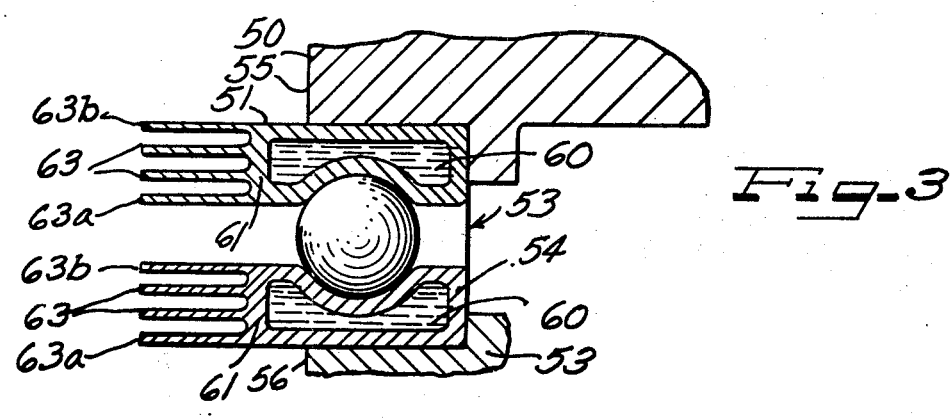
FIG. 3 is a fragmentary cross-sectional view of yet another embodiment of the anti-friction bearing assembly having hollow inner and outer raceways filled with heat transfer coolant and having axially projecting, radiating fins.

FIG. 3 illustrates a further modification of my device which may be advantageously used in connection with a bearing support positioned at the end of a shaft or adjacent the exterior of a housing. The figure fragmentarily illustrates the end of a housing 50 which receives the outer race ring 51 of an anti-friction bearing assembly 52. The assembly 52 supports a shaft 53 which is in contact with the inner race ring 54. Because the bearing assembly 52 is located at the end 55 of the housing 50, it may project axially therebeyond.

The shaft 53 is indicated as terminating at 56 at approximately the point of termination of the housing. It is, however, to be understood that the shaft may extend beyond the housing and that the housing may be in the form of a pillow block supporting the mid-point of a long shaft.

Both the inner and outer race rings 54 and 51 are hollow and are filled with a high thermal conductivity coolant 60 such as sodium. On the axial end 61 of the race ring which projects beyond the housing, a series of axially extending cooling fins 63 is provided for the dissipation of heat. As in prior embodiments, the thermal conductivity of the coolant 60 will aid in heat transference from the running faces of the bearing assembly to the area of the fins where it may be readily dissipated.

Although the fins illustrated in FIG. 3 are shown as projecting axially, it is to be understood that they may also project radially. For example, the fin 63a may be an axial extension from which radial fins may project outwardly. Alternatively, the fins 63b may be axial projections from which further coolant fins could project radially inwardly.

It can therefore be seen from the above that my invention provides for a bearing assembly member which is hollow and filled with a high thermal conductivity coolant to transfer the heat generated during operation of the bearing assembly from the rolling elements and raceways of the assembly to a point, spaced from the assembly, where the heat can more readily be dissipated.

Although the teachings of my invention have herein been discussed with reference to specific theories and embodiments, it is to be understood that these are by way of illustration only and that others may wish to utilize my invention in different designs or applications.

I claim as my invention:

1. An anti-friction bearing assembly comprising: concentric spaced apart race ring members having opposed race surfaces, a plurality of anti-friction elements interposed between said race ring members in riding contact with said races, at least one of said race ring members being hollow and substantially filled with a high thermal conductivity coolant, and cooling fins associated with said member to dissipate operationally caused heat.

2. The anti-friction bearing assembly of claim 1 wherein said cooling pins project axially.

3. The anti-friction bearing assembly of claim 1 wherein said cooling fins are radially spaced one from another and extend circumferentially around the assembly.

4. The bearing assembly of claim 1 wherein said fins project radially.

5. The bearing assembly of claim 1 wherein both of said raceway members are hollow and are substantially filled with high thermal conductivity coolant.

* * * * *